United States Patent [19]
Bergman, Jr. et al.

[11] 3,965,375
[45] June 22, 1976

[54] LITHIUM PERCHLORATE TRIHYDRATE NONLINEAR DEVICES

[75] Inventors: John George Bergman, Jr., Rumson; Glen Robert Crane, Scotch Plains; Raymond Nichols Storey, Orange, all of N.J.; Denise Williams, East St. Louis, Ill.

[73] Assignee: Bell Telephone Laboratories, Incorporated, Murray Hill, N.J.

[22] Filed: Mar. 21, 1975

[21] Appl. No.: 560,332

[52] U.S. Cl. .............................. 307/88.3; 321/69 R
[51] Int. Cl.² ......................................... H02M 5/04
[58] Field of Search ...................... 307/88.3; 321/69

[56] References Cited
UNITED STATES PATENTS 3,234,475  2/1966  Giordmaine et al. ................ 330/4.6
3,262,058  7/1966  Ballman et al. ...................... 330/4.5

OTHER PUBLICATIONS

Franken et al., "Physical Review Letters", Aug. 15, 1961, pp. 118–119.
Kurtz et al., "Journal of Applied Physics", July 1968, pp. 3798–3813.

*Primary Examiner*—James B. Mullins
*Assistant Examiner*—Darwin R. Hostetter
*Attorney, Agent, or Firm*—P. V. D. Wilde

[57] ABSTRACT

The nonlinear properties of $LiClO_4 \cdot 3H_2O$ permit noncritical phase matching in the vicinity of 5200 Angstroms at room temperature. This material may be used as the essential element in second harmonic generators and other nonlinear devices which could then be operated at room temperature under noncritical phase-matched conditions.

2 Claims, 2 Drawing Figures

LITHIUM PERCHLORATE TRIHYDRATE NONLINEAR DEVICES

BACKGROUND OF THE INVENTION

1. Field of the Invention

This invention is concerned with the use of nonlinear devices for the conversion of optical and near optical frequencies to higher or lower values. Such devices include but are not limited to second harmonic generators and parametric amplifiers. The invention lies in the discovery that lithium perchlorate trihydrate will perform this frequency conversion at preferred frequencies with high efficiency and minimal technical restrictions.

2. Description of the Prior Art

The initial application of optical, infrared and ultraviolet lasers to both research and applied projects was severely limited by the relatively limited number of frequencies at which these devices operated. The first major advance in enlarging this scope of operation involved the use of nonlinear devices. These devices are able to convert a given frequency to one of higher value, or two frequencies to their sum or difference value. While significantly broadening the scope of laser operation, even this extension left the vast majority of the optical spectrum neglected, from the point of view of available laser operation. The next major advance, the development of the dye laser, essentially filled this void. The entire visible region of the spectrum, and large portion of the infrared and ultraviolet regions are now accessible by the use of dye lasers. However, despite the dye laser, the tenure of the nonlinear devices has not been eclipsed. A number of unique attributes account for their longevity. Firstly, the nonlinear devices are, operationally, simpler than dye lasers and hence more able to withstand the rigors of applied technology. Secondly, in many regions of the spectrum they are more efficient than the dye systems. Thirdly, and of greatest interest in the light of the invention described herein, a number of nonlinear devices can be used to convert the readily available 1.064 micron light of the laser to 0.266 micron light, deep in the ultraviolet. This conversion depends on the stepwise doubling of 1.06 microns to 0.53 micron and 0.53 micron to 0.66 micron. The devices described in this invention permit one to perform this latter doubling step under the preferred noncritically phased-matched conditions at room temperature.

The description of nonlinear processes may be considerably simplified by using second harmonic generation, perhaps the most elementary of nonlinear phenomena, as a primary example, and as a vehicle to discuss the prior art. The discovery and first demonstration of second harmonic generation were made in 1961 by Franken et al. and is described in Volume 7 of the Physical Review Letters at page 118. Franken focused the 6943 Angstrom light beam of a ruby laser onto a quartz crystal and found that one part in $10^8$ of this light was converted to second harmonic light with a wavelength of 3471.5 Angstroms. This is exactly half the wavelength and hence twice the energy of the incident light. The basis for this phenomena can be most readily understood by considering the response properties of a nonlinear material such as quartz. The response of the electrons in such a material to the incident light depends upon the direction of the electromagnetic field associated with this light. The electrons in a nonlinear material are more amenable to motion in one direction than in the other. Thus the electrons move asymmetrically in response to the highly intense incident light and their motion may be represented by a harmonic wave asymmetric about the zero level. Such a dynamic response may be shown to be equivalent to the sum of two simple harmonic motions, one at the incident frequency and one at twice the incident frequency, and a constant nonzero bias value. Second harmonic generation originates with the generation of light associated with the motion which is at twice the frequency of the incident light.

The production efficiency of the frequency-doubled light is severely limited, however, because of the natural dispersion of the nonlinear material. As in all materials, the velocity of light in the medium depends on the frequency of the light and varies inversely with it. As a result of this dispersion, the frequency-doubled light travels more slowly in the medium than the incident light. The incident light travels through the medium at its more rapid pace causing the generation of additional frequency-doubled light as it goes. The previously produced frequency-doubled light may find that by the time it reaches the site of newly generated light it is out of phase with it. The two waves, when they are thusly out of step, are said to be mismatched with respect to phase and destructively interfere with each other. The amount of frequency-doubled light emitted by the crystal is then severely diminished.

As a result of the phase mismatch problem, the application of nonlinear phenomena to practical devices was impeded until a critical discovery by Giordmaine and Kleinman U.S. Pat. No. 3,234,475). They realized that the birefringent properties of certain nonlinear materials might be used to compensate for the dispersive effect and thereby alleviate the phase mismatch. In a birefringent material, light of a given frequency and vector wave number will travel in two different modes. The polarization of these two modes will be orthogonal to each other and their velocities will be different. In a negative uniaxial crystal, the velocity of one of these modes, the extraordinary ray, will be greater than that of the other mode, the ordinary ray. If the incident light is in the ordinary ray mode and the frequency-doubled light is in the extraordinary mode, then two velocity effecting phenomena come into play. Dispersion tends to lower the velocity of the frequency-doubled light relative to the incident light while birefringence tends to have the opposite effect. Since the magnitude of the birefringence depends on the angle of incidence between the incident light and the optic axis of the crystal, it is conceivable that an angle can be chosen for which the birefringence is of exactly the right magnitude to cancel the effect of dispersion. Under such conditions phase matching is said to exist and the production efficiency of frequency-doubled light rises by orders of magnitude. Angle tuning the birefringence, as just described, has one severe drawback. Unless the angle of incidence is 90°, that for which maximum birefringence occurs, a refractive phenomena known as walkoff occurs with a resultant loss of efficiency. It is clear then that noncritical phase matching, which describes a phase-matched condition with incident angle of 90°, is most desirable. However, it is also clear that most conditions of phase matching will not necessarily be met at Boyd, 90° angle of incidence.

In a patent issued in 1966 to Ballman, Boyd and Miller (U.S. Pat. No. 3,262,658) another technique for controlling the birefringence was disclosed, thereby allowing a preset 90° angle of incidence. These inventors disclosed that the birefringence-dispersion relationship can be controlled by temperature variation. Noncritical phase-matched conditions could then be attained by operating at the proper temperature. Such a material can be operated under noncritically phase-matched conditions at any given frequency over a wide region of the spectrum by merely setting the temperature accordingly. However, the very attribute that allows for temperature tuning dictates careful temperature control. Small temperature variations will detune the crystal from the desired operating conditions. When a given frequency is to be used extensively, the most desirable material would be one that, in addition to being noncritically phase matched at room temperature for the desired frequency, is insensitive to temperature variation. LiClO$_4$.3H$_2$O, the material which is the subject of this application, has these qualities when used at 0.53 micron, a region of considerable interest.

Despite the fact that 15 years have elapsed since the first demonstration of second harmonic generation, the number of effective and efficient nonlinear materials remains relatively limited. The most widely used of these materials take advantage of the temperature tuning technique. So, for example, the very important 1.06 micron line of the Nd-YAG laser can be frequency doubled twice to obtain 0.265 micron light in the ultraviolet, of significant use to research and technology alike. The doubling step from 0.530 to 0.265 is accomplished by means of a temperature-tuned nonlinear device. It is one of the objects of the present invention to provide a material which will accomplish this step under noncritical phase-matched conditions at room temperature, thereby obviating the need for temperature tuning apparatus.

Other considerations in evaluating a material for use in a nonlinear device, which are not central but nonetheless important, include (a) maximum allowable power levels of the incident radiation, (b) degree of nonlinearity, and (c) material stability under conditions of use.

While the above discussion has been in terms of second harmonic generation, it is clear that there are a host of other nonlinear phenomena to which a viable material might be applied. Such other devices, which might be utilized through the practice of the present invention, include parametric amplification, oscillation, mixing, etc. The operation of such devices is thoroughly understood to those skilled in the art.

SUMMARY OF THE INVENTION

Applicants have discovered that the properties of lithium perchlorate trihydrate (LiClO$_4$.3H$_2$O) are such as to make it highly useful in nonlinear devices. At the present time this material is the only one that is known to be insensitive to temperature variations and which will frequency double 5300 Angstroms at room temperature. The crystals are hexagonal (P6mc) and may be grown from aqueous solution by evaporation techniques well known to those skilled in the art.

DETAILED DESCRIPTION

In the course of a search for new nonlinear materials, applicants performed an extensive study of the linear and nonlinear properties of lithium perchlorate trihydrate (LiClO$_4$.3H$_2$O). Three quantities must be measured to evaluate the applicability of a material in nonlinear devices. The first is the index of refraction of both the ordinary and extraordinary waves. If the birefringence is to be effective in eliminating the destructive interference of the induced wave within the crystal, then it must be sufficiently large so as to compensate for the dispersion difference between the original and induced frequencies. This requirement may be expressed by the formula:

$$n^o_\omega \geq n^e_{2\omega} \qquad (1)$$

Figure 1:
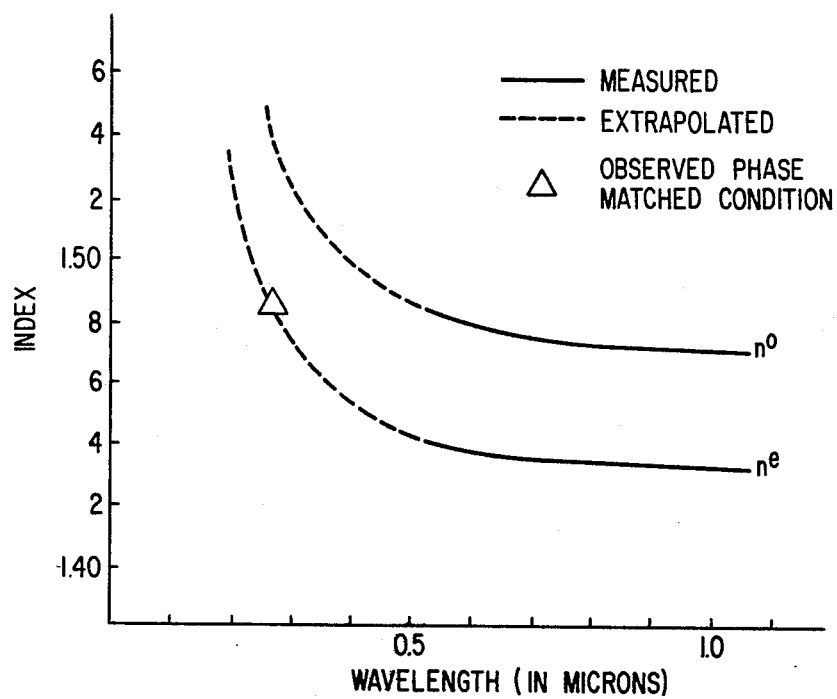
FIG. 1 is a plot of the observed index of refraction for LiClO$_4$.3H$_2$O on the ordinate, against the wavelength in microns on the abscissa.

Here $n$ is the index of refraction, $o$ and $e$ refer to the ordinary and extraordinary rays, respectively, and $\omega$ and $2\omega$ are any given frequency and its harmonic. The indices of refraction for lithium perchlorate trihydrate were measured by cutting the crystal into thin wedges with wedge angle less than 5° and utilizing the well-known minimum deviation technique. FIG. 1 displays the results of those measurements, made throughout the visible and for both the ordinary and extraordinary rays. It is clear that the phase matching condition as expressed in Equation (1) may be obtained for incident radiation of wavelength from approximately 0.5 to 1.0 micron.

The other quantities of interest in nonlinear materials are the coherence length and relevant nonlinear relevant nonlinear coefficients. The coherence length is that length through the crystal whose traversal will cause a transmitted wave to be 180 degrees out of phase with a newly generated wave. The nonlinear coefficients are related to the efficiency of second harmonic light production within the crystal. The coherence lengths and the nonlinear coefficients were measured using the same 5° wedges mentioned above. A Q-switched Nd-doped YAG laser emitting at 1.06 microns was used to irradiate the wedge and the second harmonic signal was observed. Translation along the wedge direction give alternating maxima and minima. The length between maxima is a measure of the coherence length.

Adjusting the wedge for emission of the second harmonic peak allows for the measurement of the nonlinear coefficient. The components of the vector nonlinear polarization $\overline{P}$ at the second harmonic frequency may be given in terms of $\overline{E}$, the electric field associated with the impinging light and the tensor of nonlinear coefficients $d$, i.e., $$\overline{P} = \underline{d}\, \overline{E}^2. \qquad (2)$$

Various symmetry arguments may be used to simplify this expression, and for the case of a crystal of 6mm symmetry, such as LiClO$_4$.3H$_2$O, $$P_x = d_{15} E_x E_z, \qquad (3a)$$

$$P_y = d_{15} E_y E_z, \qquad (3b)$$

$$P_z = d_{31} E_x^2 + d_{31} E_y^2 + d_{33} E_z^2. \qquad (3c)$$

A further relation among the coefficients, according to the Kleinman symmetry, is $$d_{15} = d_{31}. \tag{4}$$

According to Equation (3c) polarizing the impinging light along first the $x$ and then the $z$ directions gives $d_{31}$ and $d_{33}$, respectively. According to Equation (3a) polarizing the impinging light in the $x$–$z$ plane but intermediate between the $x$ and $z$ direction permits the measurement of $d_{15}$. In addition to these measurements, it was determined that the birefringence properties of $LiClO_4 \cdot 3H_2O$ are substantially temperature independent. The phase-matching angle for doubling 0.532 micron to 0.266 micron was observed to be 84 degrees indicating approximate noncritical phase matching at this wavelength. No optical damage was observed when a focused 0.53 micron fundamental of intensity $\sim 10^8 W/cm^2$ was incident on the crystal. Although water soluble, the crystal appears to be stable even to multiyear storage under only minimum precautions.

Table I is a tabulation of the observed and calculated coherence lengths for $LiClO_4 \cdot 3H_2O$ and the observed nonlinear coefficients compared with those of the most efficient nonlinear material ADP.

TABLE I

Coherence lengths ($l_{ij}$) and nonlinear coefficients ($d_{ij}$) of $LiClO_4 \cdot 3H_2O$ relative to $d_{11}$ of quartz.

|  | obs ($\mu$) | calc. ($\mu$) |
|---|---|---|
| $l_{33}$ | 25.4 | +26.8 |
| $l_{31}$ | −9.7 | −9.0 |
| $l_{15}$ | 8.6 | +8.0 |
| $d_{33}$ | ±0.79 | |
| $d_{31}$ | ±0.68 | |
| $d_{15}$ | ±0.77 | |

Nonlinear coefficients ($d_{ij}$) of $LiClO_4 \cdot 3H_2O$ relative to .3H

| $d_{33}$ | 0.59 |
| $d_{31}$ | 0.50 |
| $d_{15}$ | 0.57 |

$d_{11}(SiO_2) \cong 0.74 \, d_{36}$ (ADP)

*Estimated standard errors for $d_{ij}$'s are ±20 percent. Interference measurements showed $d_{33}d_{31} > 0$. The observed and calculated interference coherence lengths were 6.8 and 7.2 microns, respectively.

Figure 2:
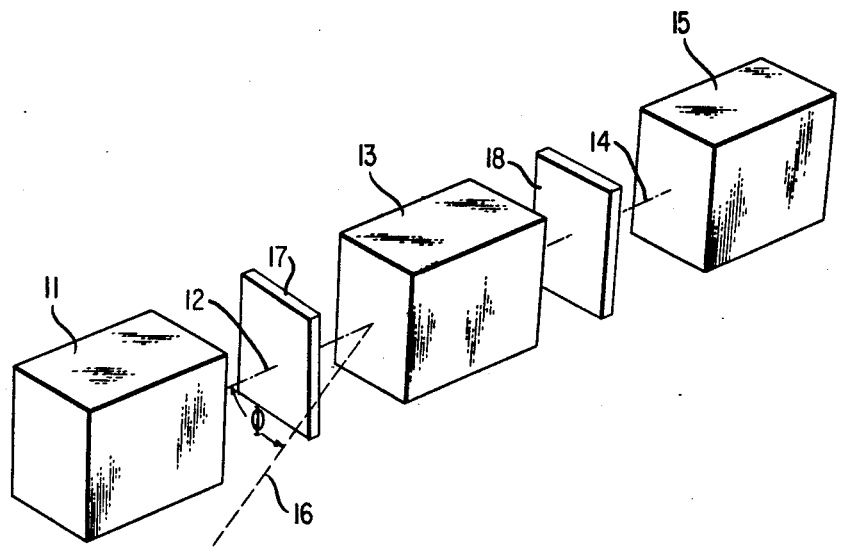
FIG. 2 is a schematic representation of a nonlinear device using LiClO$_4$, labeled 13, as the active element.

FIG. 2 is a schematic of the nonlinear device using $LiClO_4$ as the active element. In this Figure, 11 is a source of coherent radiation, 12, and will be a laser in most cases. The light generated by the nonlinear device, 14, is detected at 15. This impinging beam is shown entering the crystal, 13, at an angle $\phi$ relative to 16, the optic axis of the crystal. Any optics necessary to properly focus the light on 13 is included in 11. Likewise, 15 may include any optics necessary to efficiently collect the emitted light 14. In certain applications, the device may be operated with a resonant means in order to support a standing wave of one of the wavelengths in the crystalline body. In such an event, 17 and 18 shown in the Figure would represent an appropriate resonant means, such as partially reflecting mirrors necessary to support the said standing wavelength.

In the preferred embodiment, the emitted light 14 is the second harmonic of the impinging light 12. Under these circumstances, 12 may be any wavelength between 0.5 and 1.0 micron, although the fullest advantage is derived from this invention when 12 is about 0.53 micron.

The device of FIG. 2 might also be used as a mixer or a parametric oscillator. In such a case, 12 would be the two input frequencies and 14 would be the output beam.

The invention then comprises a nonlinear device with $LiClO_4 \cdot 3H_2O$ as the active element. The preferred embodiment involves second harmonic generation, e.g., 0.265 micron from a 0.53 micron fundamental. Alternatively, the device may be used to frequency double any wavelength from 1.0 to 0.53 micron under critically phase-matched conditions. The practice of this invention to frequency double 0.53 micron could be used as part of a device which would quadruple the very important 1.06 micron line. The $LiClO_4$ doubler would operate under essentially noncritically phase-matched conditions at room temperature and is insensitive to temperature variations.

What is claimed is:

1. A device comprising a crystalline body consisting essentially of $LiClO_4 \cdot 3H_2O$, with means for introducing into said crystalline body a beam of coherent plane polarized electromagnetic radiation of a first wavelength of approximately 5300 Angstroms, and means for utilizing a beam of coherent electromagnetic radiation of a second wavelength of approximately 2650 Angstroms emitted from said body, the said body being positioned in such a way that the angle between the beam of first wavelength and the optic axis of said crystalline body is such that the first beam and second beam are essentially noncritically phase matched within the crystal at approximately room temperature.

2. The device of claim 1 together with a resonant means of supporting a standing wave of one of said frequencies in said crystalline body.

* * * * *